(12) United States Patent
Grzonkowski et al.

(10) Patent No.: US 11,496,489 B1
(45) Date of Patent: Nov. 8, 2022

(54) KNOWLEDGE-AWARE DETECTION OF ATTACKS ON A CLIENT DEVICE CONDUCTED WITH DUAL-USE TOOLS

(71) Applicant: CA, Inc., San Jose, CA (US)

(72) Inventors: Slawomir Grzonkowski, Dublin (IE); Johann Roturier, Maynooth (IE); Pratyush Banerjee, Dublin (IE); David L. Silva, Dublin (IE)

(73) Assignee: CA, Inc., San Jose, CA (US)

( * ) Notice: Subject to any disclaimer, the term of this patent is extended or adjusted under 35 U.S.C. 154(b) by 890 days.

(21) Appl. No.: 16/367,599

(22) Filed: Mar. 28, 2019

(51) Int. Cl.
*H04L 9/40* (2022.01)
*G06N 20/00* (2019.01)
*G06F 16/22* (2019.01)

(52) U.S. Cl.
CPC .......... *H04L 63/1416* (2013.01); *G06F 16/22* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2015/0058945 A1* | 2/2015 | Su | ........................ | H04W 12/06 726/7 |
| 2017/0142136 A1* | 5/2017 | Yi | ........................ | G06F 16/22 |
| 2018/0288063 A1* | 10/2018 | Koottayi | ............. | H04L 63/1416 |
| 2019/0349391 A1* | 11/2019 | Elsner | ................. | H04L 63/1416 |
| 2020/0050761 A1* | 2/2020 | Lancioni | ............... | G06F 21/563 |

FOREIGN PATENT DOCUMENTS

| | | | |
|---|---|---|---|
| CN | 109474586 A | * 3/2019 | |
| WO | WO-2018090794 A1 | * 5/2018 | ............. G06Q 20/10 |

OTHER PUBLICATIONS

Troy Wojewoda, Hunting and Gathering with PowerShell Mar. 10, 2019, The SANS Institute, pp. 2,3 (Year: 2019).*
Windows 10 Tip: View Your Clipboard History, Nov. 15, 2018, BruceB Consulting (Year: 2018).*

* cited by examiner

*Primary Examiner* — Joseph P Hirl
*Assistant Examiner* — Aayush Aryal
(74) *Attorney, Agent, or Firm* — Adsero IP

(57) ABSTRACT

Knowledge-aware detection of attacks on a client device conducted with dual-use tools. A method may include obtaining dual-use tool data related to a plurality of dual-use tools; collecting from a client device, by the computing device, user input related to the use of a dual-use tool of the plurality of dual-use tools; determining that the user input contains a feature of the dual-use tool data; creating a behavioral index of the user input, the behavioral index stored on the client device; detecting new input on the client device; determining a similarity level between the user input and the new input; flagging a malicious attack on the client device based on determining that the similarity level does not satisfy a pre-determined threshold; and implementing a security action on the client device based on flagging the malicious attack.

20 Claims, 3 Drawing Sheets

US 11,496,489 B1

KNOWLEDGE-AWARE DETECTION OF ATTACKS ON A CLIENT DEVICE CONDUCTED WITH DUAL-USE TOOLS

BACKGROUND

There is an increase in malicious actors using fileless malware to attack computer systems and computer networks, where the fileless malware resides solely in memory and does not write any files to disk. These fileless attacks may use living-off-the-land attacks, where attackers use tools that are already installed on a targeted computer system or network. Attackers using living-off-the-land attacks may conduct these attacks using trusted off-the-shelf and pre-installed system tools that users of the computer system and network may also use for legitimate purposes.

Unfortunately, living-off-the-land attacks may be difficult to detect, and thus it may be difficult to build and execute a security plan to successfully thwart these attacks.

SUMMARY

In some embodiments, a computer-implemented method for knowledge-aware detection of attacks on a client device conducted with dual-use tools may be performed, at least in part, by a computing device including one or more processors. The method may include obtaining, by a computing device, dual-use tool data related to a plurality of dual-use tools; collecting from a client device, by the computing device, user input related to the use of a dual-use tool of the plurality of dual-use tools; determining, by the computing device, that the user input contains a feature of the dual-use tool data; creating, by the computing device, a behavioral index of the user input, the behavioral index stored on the client device; detecting, by the computing device, new input on the client device; determining, by the computing device, a similarity level between the user input and the new input; flagging, by the computing device, a malicious attack on the client device based on determining that the similarity level does not satisfy a pre-determined threshold; and implementing, by the computing device, a security action on the client device based on flagging the malicious attack.

In some embodiments, the implementing of the security action may further include one or more of blocking network connectivity to the client device, or quarantining the client device, or a combination thereof.

In some embodiments, the method may further include training, by the computing device, a machine learning model on the user input; updating the behavioral index by applying the machine learning model to the behavioral index; and determining that the malicious attack should be flagged based on an output of the machine learning model.

In some embodiments, the obtaining of the application data may further include obtaining a list of names of dual-use tools, signatures, hashes, elements, code, or comments, or a combination thereof, from a third-party software development platform.

In some embodiments, the collecting of the user input may further include scraping one or more of a webpage, a document, a file, a command line, or a clipboard, or a combination thereof, associated with the client device, where scraping may include automatically collecting the user input including one or more of a user search query, command line history input, data entry, or commands copied to a clipboard, or a combination thereof.

In some embodiments, the method may further include extracting tokens from the user input by extracting command names, positional arguments, and named arguments from the user input.

In some embodiments, the determining of the new input may include determining that the user copied a command onto a clipboard associated with the client device.

In some embodiments, the determining of the similarity may include applying an edit-distance algorithm between the new input and previous user input present in the behavioral index.

In some embodiments, the determining of the similarity may include determining that no bits are different between a string of the new input and a string of the user input, from the behavioral index;—and indexing the new input as legitimate input based on determining that no bits are different.

In some embodiments, the determining of the similarity may include determining that a change in bits between a string of the new input and a string of the user input, from the behavioral index, satisfies a confirmation policy threshold; and requesting confirmation from the user that the new input was entered by the user into the client device.

In some embodiments, the determining of the similarity may include determining that a change in bits between a string of the new input and a string of the user input, from the behavioral index, satisfies a threat threshold; and implementing the security action on the client device based on determining that the change in bits satisfies the threat threshold.

In some embodiments, a computer device may include a processor, a memory in electronic communication with the processor, and instructions stored in the memory, with the instructions being executable by the processor to perform a method for knowledge-aware detection of attacks on a client device conducted with dual-use tools.

In some embodiments, one or more non-transitory computer-readable media may include one or more computer-readable instructions that, when executed by one or more computing devices, cause the one or more computing devices to perform a method for knowledge-aware detection of attacks on a client device conducted with dual-use tools.

BRIEF DESCRIPTION OF THE DRAWINGS

Embodiments will be described and explained with additional specificity and detail through the use of the accompanying drawings in which.

DETAILED DESCRIPTION

A living-off-the-land attack may be an attack using pre-installed software, where no additional binary executables are installed into the system by the attacker. In some examples, these attacks may be executed using dual-use tools, where a dual-use tool may be a legitimate system tool or clean application that may also be misused for malicious purposes by attackers. For example, the two clean commands below create a new user and add it to the administrator group, if executed with the right permissions:

net user/add [username] [password]
    net localgroup administrators [username]/add These commands can be considered dual-use because they can be used by system administrators for legitimate reasons but can also be used by an attacker as a backdoor attempt to maliciously infiltrate a system, especially when the remote desktop service is enabled as well. Because the attacker does not have to create a new file on the hard disk of a targeted computer, the attacker has less chance of being detected by traditional security tools, and is thus less likely to have the attack blocked.

In addition, living-off-the land attacks may be difficult to detect because the input used at, for example, a command line during the use of PowerShell, may appear legitimate when it is not, in fact, a legitimate user-input command. Some users may be very computer savvy and may be able to enter commands into a command-line interface (CLI) without turning to online resources (e.g., forums, webpages, notes), whereas other users may be less computer savvy and may need to turn to other resources to know which commands to enter and how to create commands. A user may therefore develop a habit of doing research, searching for commands, copying and pasting commands from webpages, forums, notes, etc., as well as develop a specific syntax or method of entering commands into the CLI over time. Thus, a user's behavioral context may be determined and used to predict whether a new input is legitimately user-entered or is instead an attacker using a legitimate dual-use tool for a malicious purpose.

Typical command line tools accept a range of commands that may be hard to remember by users, and users may remember commands with varying degrees of success. Therefore, a user may rely on their own notes or search engines to obtain usage examples or snippets that may be copied and pasted into a terminal and/or edited by the user to fit the user's needs.

The embodiments described herein may leverage the user's behavioral context determined in order to build a personalized model that obtains and takes into account multiple data elements (e.g., presence of a command in search history, browsing history, command history, clipboard history, etc.) through a combination of n-grams and similarity hashes (such as edit-distance). Furthermore, the model may preserve user privacy by extracting relevant information and storing it locally.

Figure 1:
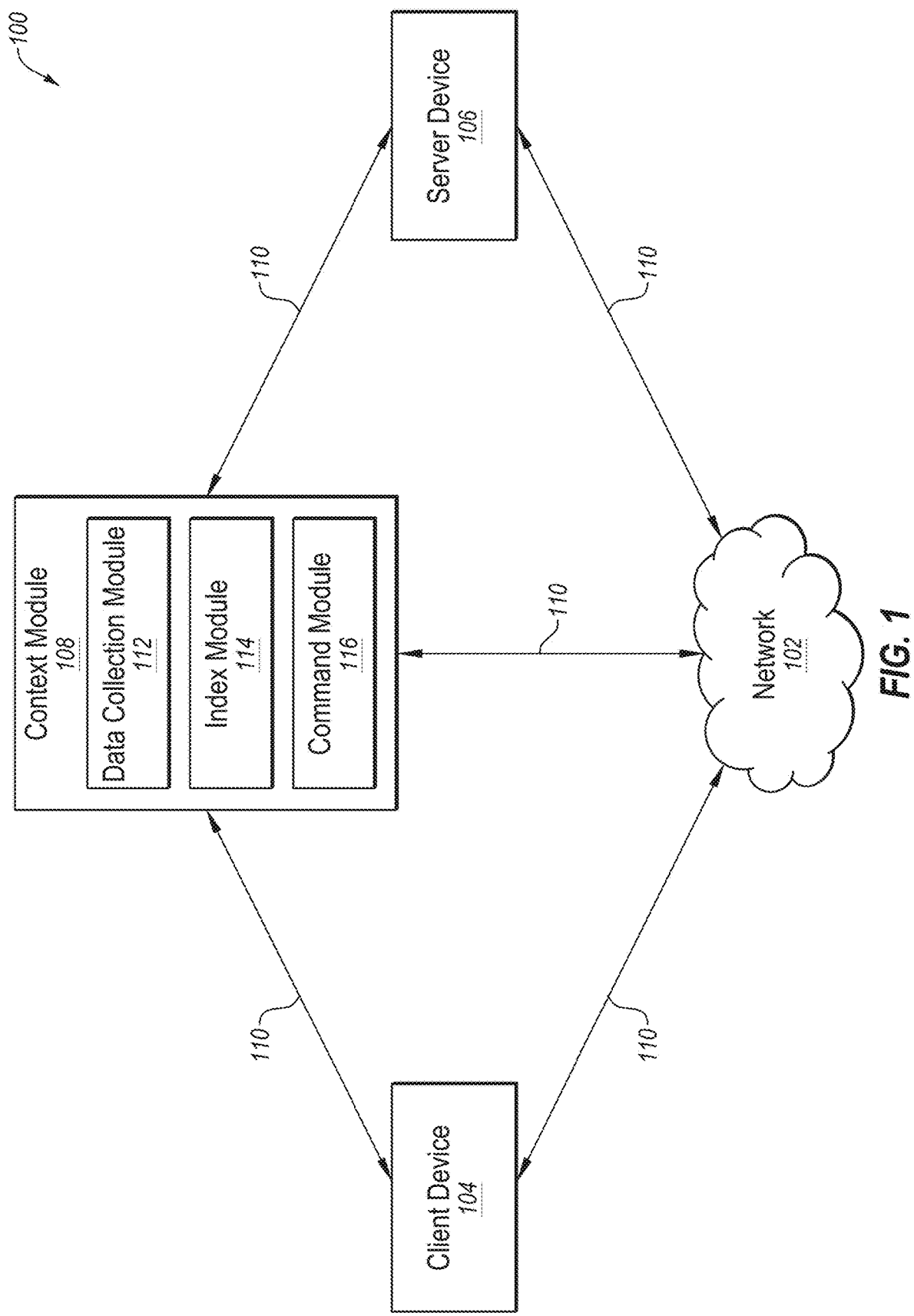
FIG. 1 illustrates an example system configured for knowledge-aware detection of attacks on a client device conducted with dual-use tools.

Turning to the figures, FIG. 1 illustrates an example system 100 configured for knowledge-aware detection of attacks on a client device conducted with dual-use tools. The system 100 may include a network 102, a client device 104, a context module 108, and a server device 106. In one embodiment, the context module 108 may operate on a standalone computing device, on the client device 104, and/or on the server device 106.

In some embodiments, the network 102 may be configured to communicatively couple the client device 104, the context module 108, and/or the server device 106 by way of the communication links 110. In some embodiments, the network 102 may be any wired or wireless network, or combination of multiple networks, configured to send and receive communications between systems and devices by way of the example communication links 110. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

In some embodiments, the client device 104 may be a computer system capable of communicating over the network 102, with context module 108, and/or with the server device 106. Examples of this computer system is disclosed herein in connection with the computer system 300 of FIG. 3. In some embodiments, the client device 104 each be a computer device, such as a smartphone, desktop computer, laptop computer, control system, tablet, computer wearable device, etc. Although the client device 104 is specifically shown as connected through the communication links 110, the client device 104 may be connected to any other device in system 100 or outside of system 100 through any contemplated communication means.

In some embodiments, the server device 106 may be any computer system capable of communicating over the network 102 with the client device 104 and/or the context module 108. The context module 108 may further include a data collection module 112, an index module 114, and/or a command module 116. In one embodiment, each of the modules 112, 114, and/or 116 may be independent software engines in communication with one another and capable of communications with the client device 104 and/or the server device 106. In an additional or alternative embodiment, the modules 112, 114, and/or 116 may be part of a single software engine. Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Further, it is understood that the communication links 110 between the components illustrated in FIG. 1 (illustrated as left-right arrows) may be part of the network 102 or another network.

In one embodiment, the context module 108 may be a personalized, privacy preserving module based on the user's inputs (e.g., the presence of a command in the user's search history, the user's web browsing history, the user's command history, the user's clipboard, etc.). In addition, the context module 108 may store user's behavioral context data on the client device 104 using word-to-similarly hash mapping technique to minimize privacy concerns and maximize usage). Thus, the context module 108 may detect input (e.g., commands) that are not likely to have been input by a specific user based on a previous determination of a user's historical inputs (i.e., determining that usage of the dual-use tool is by an attacker because the structure of the commands is dissimilar rather than expected from the user based on historical data).

In one embodiment, the context module 108 may access a list of system tools and otherwise clean application that may have been previously used as a dual-use tool or could be used as a dual-use tool in the future. A dual-use tool may be any tool that an attacker may use to perform actions that lead to the malicious goal. Any system tool may be used in an unintended or malicious way, however some tools may be more frequently used, or more obvious, that others. For example, the context module 108 may access the list from a user-sourced webpage such as https://github.com/api-cradle/LOLBAS. In one embodiment, the list may contain the names of tools as well as associated signatures and hashes.

In addition, the context module 108 may have some error consideration to handle basic version differences.

In order to use these dual-use tools, the attacker needs to pass specific arguments to the tool. In one embodiment, this may be achieved on a command line when launching the tool (e.g., after gaining a remote command shell access, using batch script files with all the command predefined). Again, by using these otherwise "clean" tools, attackers can attempt to evade detection. In order to determine whether entering of these commands can be flagged as malicious, the context module 108 may collect user data over a period of time to track the behavior of a user as the user interacts with these tools, and in order to distinguish between normal usage and malicious usage.

The context module 108 may utilize three modules: the data collection module 112, the index module 114, and the command module 116 for user's behavioral context-based dual-use tool detection in living-off-the-land attacks.

In addition to the list of tools, signatures and hashes obtained by the context module 108, the data collection module 112 may collect the commands obtained by or issued by a user on the client device 104 over time (e.g., historically). The commands may be collected, for example, when the user is browsing the Internet, reading notes, copying and pasting from documents or other programs, or obtained from the user's command-line interface history.

In one embodiment, webpages may be identified by an automated web parser as being related to tools recognized to be, or suspected to be, associated with dual-usage. In one embodiment, a scraper or other data extraction tool, may be used to automatically collect user data from a variety of sources, such as webpages, command line history, search query history, copy and paste history, other documents, etc. In one embodiment, a webpage scraper may scrape user-visited webpages from the identified webpages (e.g., tech forums, programming pages, etc.). For these webpages, the webpage scraper may obtain lines of interest containing commands known to be used, or determined to likely be used, in tools determined to be dual-usage. New commands may also be detected based on the new commands' proximity with existing commands and the list collected by the context module 108 (e.g, in physical distance, in edit distance, etc.). Newly detected commands may be used to update both the collected historical commands list and the dual-use tools list. To avoid re-indexing the same information repeatedly, visited uniform resource locators (URLs) are kept track of, with bloom filters used to determine if an element is already present in the list (e.g., index).

The data collection module 112 further checks whether the user makes a copy (e.g., using a copy command) of any part of a webpage (e.g., a string) or other file more of any webpage to the user's clipboard, regardless of the categorization of the webpage or the file. The data collection module 112 then determines whether the copied string contains any of the elements deemed to be associated with a command or a dual-use tool, with the user's historical behavior, CLI commands previously input by the user, such that the string may be collected as part of the user's behavioral context.

In one embodiment, the index module 114 may create and update a privacy-preserving index associated with the user's behavioral context. The index may be stored locally on the client device 104 without being shared with other parties unless the user consents. In an additional or alternative embodiment, the index may be temporarily updated to take into account the context of another user (e.g., an administrator, another user authorized to use the same computer, etc.)

In an additional or alternative embodiment, the index module 114 may extract relevant tokens from the data collected by the context module 108 and the data collection module 112, by extracting command names, positional arguments, named arguments. Additionally, named values may be extracted, normalized, and featurized (e.g., converting inputs and labels into a representation suitable for machine learning) to avoid penalizing placeholder replacements (e.g., <hostname> with local host). Similarly, complex values (which may be indicative of sophisticated malicious usage), may be normalized and featurized in such a way that some information may be retained when performing a distance-based comparison. Distance-based comparisons may be made, for example, using an edit-distance algorithm, as a way to quantify how dissimilar two strings are from one another by counting the minimum number of operations required to transform one string into the other.

The index module 114 may further store strings, words, and/or tokens to similarity hashing mappings for faster lookups and distance comparisons. Thus, the index module 114 may store user-specific content in a local database associated with the client device 104.

In one embodiment, the command module 116 may monitor whether any of the commands input by the user (whether manually typed in, pasted, or by way of a batch file) and used for a command line prompt on a CLI. The index module 114 may then determine a similarity value between the command input and the data collected by the context module 108 and/or the data collection module 112. In one embodiment, the similarity may be determined by calculating the distance between the commands and the most similar command present in the user's behavioral context. In one embodiment, the similarity may be determined using similarity hash comparisons.

For example, an example index for two commands may include:

powershell.exe —nop —enc \""JAB3AGMAPQBOAGUAdwAtAE8AYgBqAGUAYwB0 which may correspond to a similarity hash of: 0110010000011101; and powershell get-WmiObject win32_logicaldisk—Computername remotecomputer which may correspond to a similarity hash of: 011100001110.

Keywords from the commands may be given similarity hashes as follows: powershell, 0110010000111001, 011100001110 enc_1_37 (JAB3AGMAPQBOAGUAdwAtAE8AYgBqAGUAYwB0), 011100001110
nop, 0110010000011101
enc, 0110010000011101
get-WmiObject, 011100001110
win32_logicaldisk, 011100001110
Computername, 011100001110,]
Computername_1_14 (Remotecomputer), 011100001110

The index module 114 may consider a list keywords (before normalization occurs) to determine a similarity hash between the commands and the user behavioral context. For example, the user may input the command:

powershell get-WmiObject win32_logicaldisk—Computername localhost

Both similarity hashes should be retrieved because one of the key words (powershell) is in both entries and also in the user supplied command. However, the hash 011100001110 has more keywords in common with the user's supplied command and thus is given a higher similarity score using the following formula:

normalized_edit_distance*(percentage of unigrams in a given similarity hash)

where a unigram may be a one word n-gram collected from the text.

In determining the similarity, the context module 108 may determine whether some of the bits between the strings have been changed (e.g, using an edit distance algorithm). In one embodiment, when there is no change, the command usage is deemed legitimate. In an additional or alternative embodiment, if the change of bits is below a policy-defined threshold, the user may be queried for confirmation on the user's legitimate usage of dual-use tools in order to reduce the amount of false positives over time (e.g., asked to confirm if they have issued the command). If confirmation is received, the index module 114 may be updated with the new input. In an additional or alternative embodiment, if the change exceeds the policy-defined threshold, a policy-defined security action may be triggered (e.g., like isolation).

In one embodiment, the collection of data (e.g., URL classification, webpage scraping, command line scrapping, clipboard scrapping), the indexing and context-based generation to determine similarities, and flagging potential living-off-the-land dual-use tool usage by a malicious actor may be enabled using machine learning. Thus, as the user continues to interact with the client device 104, the context module 108 may continue to learn the user's syntax and search methods in order to make better predictions on whether the use of the dual-use tools is by by an attacker.

Figure 2:
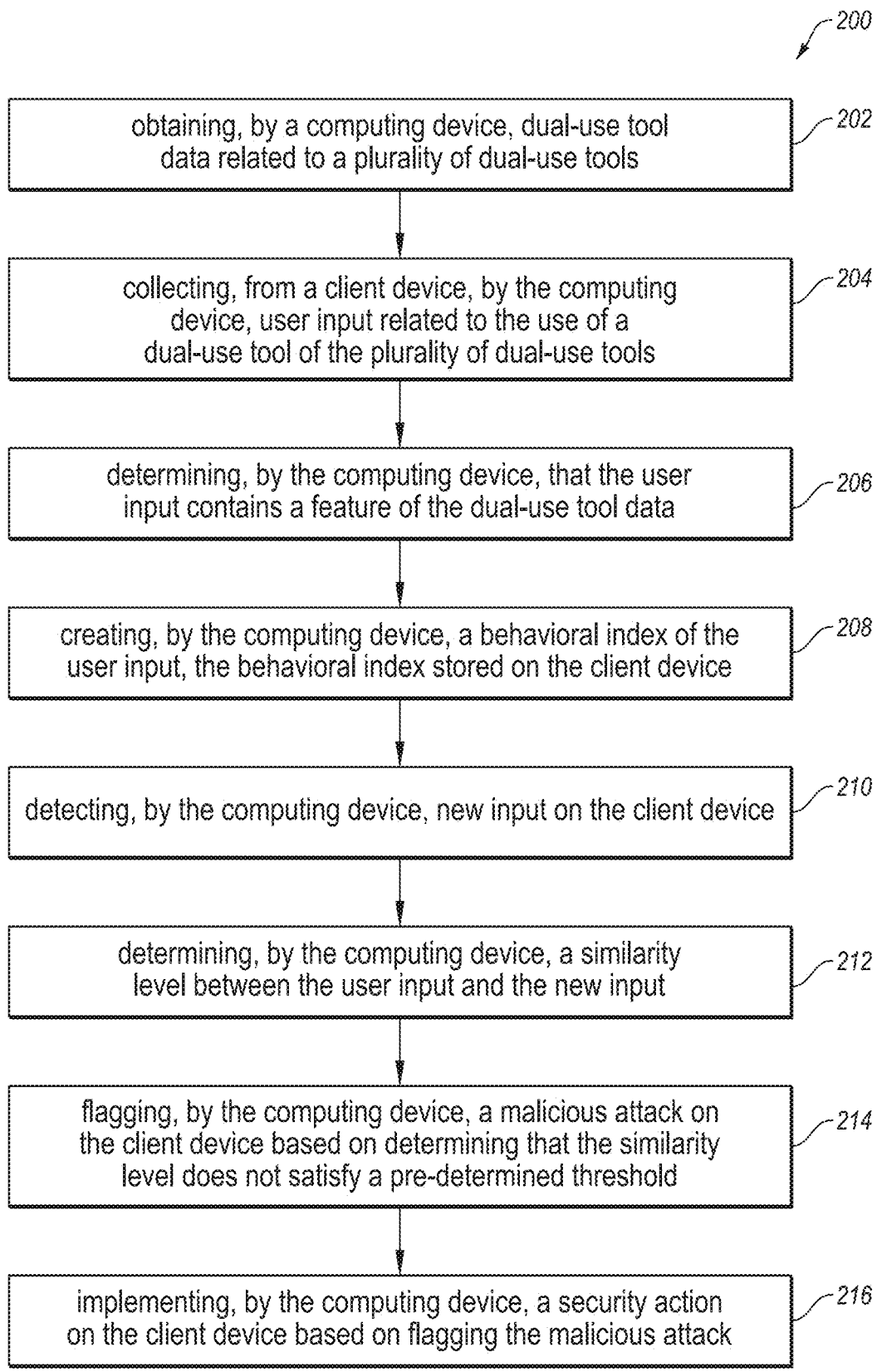
FIG. 2 illustrates a flowchart of an example method for knowledge-aware detection of attacks on a client device conducted with dual-use tools.

FIG. 2 illustrates an example method 200 for knowledge-aware detection of attacks on a client device conducted with dual-use tools. The method 200 may be performed, in some embodiments, by a device or system, such as by the client device 104, the context module 108 or any of the associated modules (e.g., the data collection module 112, the index module 114, and/or the command module 116), and/or the server device 106. In these and other embodiments, the method 200 may be performed by one or more processors based on one or more computer-readable instructions stored on one or more non-transitory computer-readable media. The method 200 will now be described in connection with FIG. 1.

Method 200 may include, at action 202, obtaining, by a computing device, dual-use tool data related to a plurality of dual-use tools. For example, the context module 108 may obtain the list of dual-use tools from a third-party software development platform.

Method 200 may include, at action 204, collecting from a client device, by the computing device, user input related to the use of a dual-use tool of the plurality of dual-use tools. For example, the data collection module 112 may collect commands input by the user by way of search queries, command line inputs, copying and pasting, editing, or a combination thereof.

Method 200 may include, at action 206, determining, by the computing device, that the user input contains a feature of the dual-use tool data. For example, the index module 114 may determine that the user is receiving commands from the list of dual-use tools.

Method 200 may include, at action 208, creating, by the computing device, a behavioral index of the user input, the behavioral index stored on the client device. For example, the index module 114 may create a context-based index of user activity, including command searching and entry, in order to predict user behavior with respect to dual-use tools.

Method 200 may include, at action 210, detecting, by the computing device, new input on the client device. For example, the command module 116 may determine the user has entered a new command at the command line interface.

Method 200 may include, at action 212 determining, by the computing device, a similarity level between the user input and the new input. For example, the command module 116 may use a similarity algorithm to create a similarity hash between previously determined commands and the new command in order to determine a likelihood of malicious usage.

Method 200 may include, at action 214, flagging, by the computing device, a malicious attack on the client device based on determining that the similarity level does not satisfy a pre-determined threshold. For example, the command module 116 may determine that the similarity between commands is too different for the commands to have been entered by the same user, and thus that the new command may be a malicious attack.

Method 200 may include, at action 216, implementing, by the computing device, a security action on the client device based on flagging the malicious attack. For example, the context module 108 may implement an isolation scheme to protect the client device 104.

Although the actions of the method 200 are illustrated in FIG. 2 as discrete actions, various actions may be divided into additional actions, combined into fewer actions, reordered, expanded, or eliminated, depending on the desired implementation.

The systems and methods described herein may provide a plurality of benefits and technological improvements, and may result in the practical application of making use of a user's context to detect anomalous dual-tool usage by building a privacy-preserving model based on user commands, thus enabling a security action to mitigate or prevent an attack. Further, it is understood that the method 200 may improve the functioning of a computer system itself. For example, the functioning of the client device 104 and/or the server device 106 may be improved by reducing the amount of stored telemetry, reducing the number of false positives (and thus, improving analytics), providing additional field data for use in telemetry sources, etc. Also, the method 200 may improve the technological field of personal and business privacy and security targeting a specific type of attack, and stopping an attack before the attack occurs or preventing an attack from causing further damage.

Figure 3:
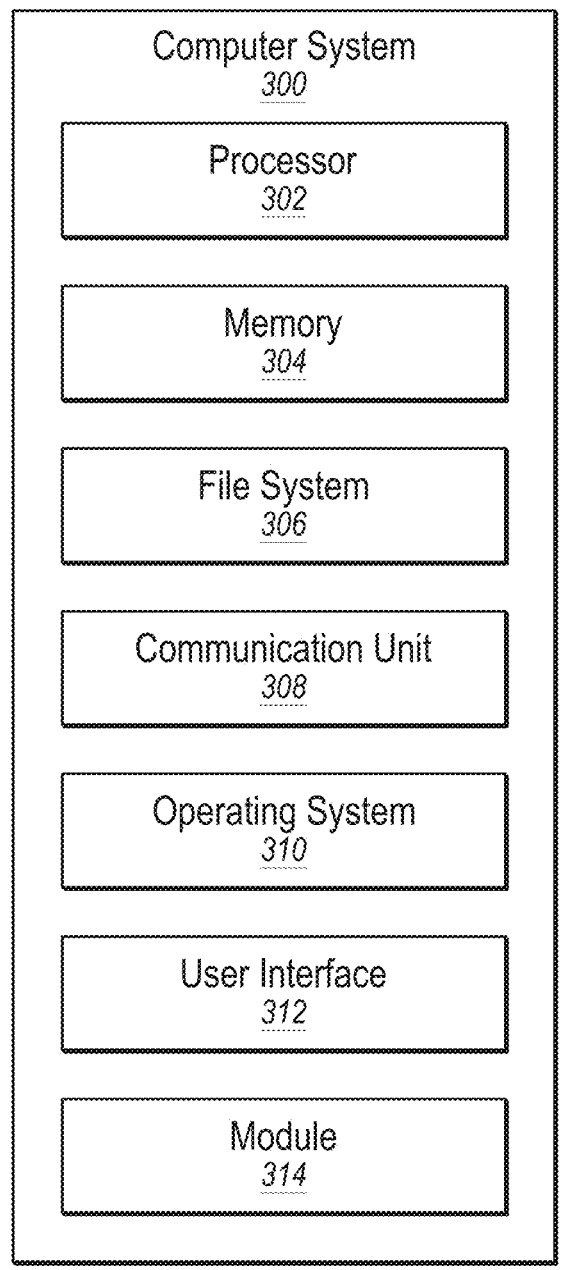
FIG. 3 illustrates an example computer system that may be employed in knowledge-aware detection of attacks on a client device conducted with dual-use tools.

FIG. 3 illustrates an example computer system that may be employed in knowledge-aware detection of attacks on a client device conducted with dual-use tools. In some embodiments, the computer system 300 may be part of any of the systems or devices described in this disclosure. For example, the computer system 300 may be part of any of the client device 104, the server device 106, the context module 108, and/or any of the data collection module 112, the index module 114, and/or the command module 116 of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a wearable device (e.g., a smartwatch, heart rate monitor, oxygen detector, thermometer), a tablet computer, a portable music player, a networking device, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more of the actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more of the actions of the method 200 of FIG. 2. These computer-executable instructions may be included, for example, in the operating system 310, in one or more applications, such as the context module 108, the data collection module 112, the index module 114, and/or the command module 116 of FIG. 1, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more of the actions of the method 200 of FIG. 2. In some embodiments, the module 314 may be part of the operating system 310 or may be part of an application of the computer system 300, or may be some combination thereof. In some embodiments, the module 314 may function as the context module 108, the data collection module 112, the index module 114, and/or the command module 116 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for knowledge-aware detection of attacks on a client device conducted with dual-use tools, at least a portion of the method being performed by a computing device comprising one or more processors, the method comprising:

obtaining, by a computing device, dual-use tool data related to a plurality of dual-use tools;

collecting, by the computing device, user input on a client device related to the use of at least one of the plurality of dual-use tools;

determining, by the computing device, that the user input contains at least a feature of the dual-use tool data;

creating, by the computing device, a behavioral index of the user input associated with the dual-use tool, wherein the behavioral index is based at least in part on one or more user actions that are performed by a user independent of the dual-use tool to interact with the dual-use tool, and wherein the behavioral index is stored on the client device;

detecting, by the computing device, new input on the client device;

determining, by the computing device, a similarity level between any of the user input and the new input;

flagging, by the computing device, a malicious attack on the client device based on determining that the similarity level does not satisfy a pre-determined threshold; and implementing, by the computing device, a security action on the client device based on flagging the malicious attack.

2. The method of claim 1, wherein the implementing of the security action comprises one or more of blocking network connectivity to the client device, or quarantining the client device, or a combination thereof.

3. The method of claim 1, further comprising:

training, by the computing device, a machine learning model on the user input;

updating the behavioral index by applying the machine learning model to the behavioral index; and determining that the malicious attack should be flagged based on an output of the machine learning model.

4. The method of claim 1, wherein the obtaining of the dual-use tool data further comprises:

obtaining a list of names of dual-use tools, signatures, hashes, elements, code, or comments, or a combination thereof, from a third-party software development platform.

5. The method of claim 1, wherein the one or more user actions that are performed by the user independent of the dual-use tool to interact with the dual-use tool comprise at least one of one or more search actions to search for one or more commands associated with the dual-use tool to enter into the dual-use tool or one or more copying actions to copy the one or more commands associated with the dual-use tool to enter into the dual-use tool.

6. The method of claim 1, wherein the collecting of the user input further comprises:

scraping one or more of a webpage, a document, a file, a command line, or a clipboard, or a combination thereof, associated with the client device, wherein the scraping further comprises:

automatically collecting the user input including one or more of a user search query, command line history input, data entry, or commands copied to a clipboard, or a combination thereof.

7. The method of claim 6, further comprising:
extracting tokens from the user input by extracting command names, positional arguments, and named arguments from the user input.

8. The method of claim 1, wherein the detecting of the new input further comprises:
determining that the user copied a command onto a clipboard associated with the client device.

9. The method of claim 1, wherein the determining of the similarity level further comprises:
applying an edit-distance algorithm between the new input and the user input.

10. The method of claim 1, wherein the determining of the similarity level further comprises:
determining that no bits are different between a string of the new input and a string of the user input; and
indexing the new input as legitimate input based on determining that no bits are different.

11. The method of claim 1, wherein the determining of the similarity level further comprises:
determining that a change in bits between a string of the new input and a string of the user input satisfies a confirmation policy threshold; and
requesting confirmation from the user that the new input was entered by the user into the client device.

12. The method of claim 1, wherein the determining of the similarity level further comprises:
determining that a change in bits between a string of the new input and a string of the user input satisfies a threat threshold; and
implementing the security action on the client device based on determining that the change in bits satisfies the threat threshold.

13. One or more non-transitory computer-readable media comprising one or more computer readable instructions that, when executed by one or more processors of a security computing device cause a computing device to perform a method for knowledge-aware detection of attacks on a client device conducted with dual-use tools, the method comprising:
obtaining, by a computing device, dual-use tool data related to a plurality of dual-use tools;
collecting, by the computing device, user input on a client device related to the use of at least one of the plurality of dual-use tools;
determining, by the computing device, that the user input contains at least a feature of the dual-use tool data;
creating, by the computing device, a behavioral index of the user input associated with the dual-use tool, wherein the behavioral index is based at least in part on one or more user actions that are performed by a user independent of the dual-use tool to interact with the dual-use tool, and wherein the behavioral index is stored on the client device;
detecting, by the computing device, new input on the client device;
determining, by the computing device, a similarity level between any of the user input and the new input;
flagging, by the computing device, a malicious attack on the client device based on determining that the similarity level does not satisfy a pre-determined threshold; and
implementing, by the computing device, a security action on the client device based on flagging the malicious attack.

14. The one or more non-transitory computer-readable media of claim 13, wherein the implementing of the security action further comprises:
one or more of blocking network connectivity to the client device, or quarantining the client device, or a combination thereof.

15. The one or more non-transitory computer-readable media of claim 13, wherein the obtaining the application data further comprises:
obtaining a list of names of dual-use tools, signatures, hashes, elements, code, or comments, or a combination thereof, from a third-party software development platform.

16. The one or more non-transitory computer-readable media of claim 13, wherein the collecting of the user input further comprises:
scraping one or more of a webpage, a document, a file, a command line, or a clipboard, or a combination thereof, associated with the client device.

17. The one or more non-transitory computer-readable media of claim 16, wherein the scraping further comprises:
automatically collecting the user input including one or more of a user search query, command line history input, data entry, or commands copied to a clipboard, or a combination thereof.

18. The one or more non-transitory computer-readable media of claim 17, further comprising:
extracting tokens from the user input by extracting command names, positional arguments, and named arguments from the user input.

19. The one or more non-transitory computer-readable media of claim 13, wherein the determining of the similarity further comprises:
applying an edit-distance algorithm between the new input and the user input.

20. A system for knowledge-aware detection of attacks on a client device conducted with dual-use tools, the system comprising:
a processor;
a memory in electronic communication with the processor; and
instructions stored in the memory, the instructions being executable by the processor to:
obtain, by a computing device, dual-use tool data related to a plurality of dual-use tools;
collect, by the computing device, user input on a client device related to the use of at least one of the plurality of dual-use tools;
determine, by the computing device, that the user input contains at least a feature of the dual-use tool data;
create, by the computing device, a behavioral index of the user input associated with the dual-use tool, wherein the behavioral index is based at least in part on one or more user actions that are performed by a user independent of the dual-use tool to interact with the dual-use tool, and wherein the behavioral index is stored on the client device;
detect, by the computing device, new input on the client device;
determine, by the computing device, a similarity level between any of the user input and the new input;

flag, by the computing device, a malicious attack on the client device based on determining that the similarity level does not satisfy a pre-determined threshold; and implement, by the computing device, a security action on the client device based on flagging the malicious attack.

\* \* \* \* \*